(12) United States Patent
Kaarela et al.

(10) Patent No.: US 9,910,934 B2
(45) Date of Patent: Mar. 6, 2018

(54) METHOD, APPARATUS AND COMPUTER PROGRAM PRODUCT FOR PROVIDING AN INFORMATION MODEL-BASED USER INTERFACE

(75) Inventors: Kari Pentti Ilari Kaarela, Oulu (FI);
Kirmo Kalevi Koistinen, Oulu (FI);
Timo Pekka Tervo, Oulu (FI); Mikko Antti Juhani Hyvarinen, Oulu (FI);
Jukka Antero Parkkinen, Oulu (FI);
Jari Jaakko Sauvola, Oulu (FI);
Heikki Veikko Juhani Korkeamaki, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1098 days.

(21) Appl. No.: 12/059,316

(22) Filed: Mar. 31, 2008

(65) Prior Publication Data
US 2009/0249355 A1    Oct. 1, 2009

(51) Int. Cl.
*G06F 17/30* (2006.01)

(52) U.S. Cl.
CPC .............................. *G06F 17/30994* (2013.01)

(58) Field of Classification Search
None
See application file for complete search history.

(56) References Cited

U.S. PATENT DOCUMENTS

| 6,085,205 A | 7/2000 | Peairs et al. |
| 6,643,691 B2 * | 11/2003 | Austin .................. H04L 29/06 709/217 |
| 2004/0215657 A1 | 10/2004 | Drucker et al. |
| 2007/0106931 A1 | 5/2007 | Vartiainen et al. |
| 2008/0243786 A1 * | 10/2008 | Stading ............. G06F 17/30011 |

FOREIGN PATENT DOCUMENTS

| KR | 10-2006-0013511 A | 2/2006 |
| WO | WO 03/083716 A1 | 10/2003 |
| WO | WO 2006/011900 A2 | 2/2006 |
| WO | WO 2008/155686 A1 | 12/2008 |

OTHER PUBLICATIONS

The Microsoft Office Open XML Formats: Prevew for Developers, Jun. 2005, pp. 1-19.*

(Continued)

*Primary Examiner* — Jason Liao
(74) *Attorney, Agent, or Firm* — Alston & Bird LLP

(57) ABSTRACT

An apparatus for providing an information model-based user interface may include a processor. The processor may be configured to access, for a particular object associated with a first application, relationship data defining one or more related objects associated with the particular object on the basis of metadata, provide for a presentation of the one or more related objects, and, in response to selection of one of the related objects, enable presentation of the selected related object via execution of an application associated with the selected related object if the application is different than the first application. A corresponding computer program product, method, and user interface are also provided.

12 Claims, 11 Drawing Sheets

(56) References Cited

OTHER PUBLICATIONS

How to add clip art to Clip Organizer in a 2007 Office system and in a Office 2003, at least as of Jan. 9, 2008, Revision 4.1, http://support.microsoft.com/kb/897754.*
Zaharov-Reutt, It's official: Vista and Office 2007 to launch in Nov. 30, Nov. 2, 2006, iTWire, http://www.itwire.com/content/view/6820/52.*
Zoello et al, Unable to open embedded PDF documents in excel 2007, May 14, 2011-May 17, 2011, techarena.in, http://forums.techarena.in/windows-software/1407424.htm.*
Easily Extract Images, Text and Embedded Files from an Office 2007/2010 Document Date unknown but captured on May 17, 2011 by archive.org, How-To Geek, http://www.howtogeek.com/50628/easily-extract-images-text-and-embedded-files-from-an-office-2007-document/.*
Hipson, Ch. 6 Associations, Linkages, and OLE: How Confusing Can This Get? 2000, Sybex, https://msdn.microsoft.com/en-us/library/bb727079.aspx.*
Dell Latitude D600 2003, Dell Inc., http://www.dell.com/downloads/global/products/latit/en/spec_latit_d600_en.pdf.*
Lemonwizard et al., How to insert one document into another in microsoft word? Jul. 6, 2010, microsoft.com, https://social.technet.microsoft.com/Forums/office/en-US/8d46d1a3-15e8-46e7-9249-4cdbec4f4e11/how-to-insert-one-document-into-another-in-microsoft-word?forum=word.*
Ehrli, Walkthrough: Word 2007 XML format Jun. 2006, Microsoft, https://msdn.microsoft.com/en-us/library/bb266220%28v=office.12%29.aspx.*
grymwulf2000, MS Office 2007—Inserting an Excel Table into a Word Doc Dec. 5, 2008, youtube.com, https://www.youtube.com/watch?v=JD9Jjr4KaN8.*
Kang, H. et al., *Exploring personal media: A spatial interface supporting user-defined semantic regions*, Journal of Visual Languages and Computing, 17 (2006), pp. 254-283.
Suresh, C. et al., *Active Notes: Context-sensitive Notes for Mobile Devices*, Proc. of the 4$^{th}$ Intl. Conf. on Mobile Technology, Applications and Systems (Mobility 2007), pp. 716-723.
International Search Report, Appl. No. PCT/FI2009/050204, dated Jul. 2, 2009.
Office Action for Chinese Application No. 200980120203.1 dated Oct. 17, 2012.
Extended European Search Report for corresponding European Application No. 09727102.7 dated Feb. 25, 2016, 8 pages.
Miller, J. et al., *From Documents to Objects: An Overview of LiveDoc*, [Retrieved Nov. 27, 2007] Retrieved from the internet: <URL: http://www.sigchi.org/bulletin/1998.2/miller3.html>. (Apr. 1998) 7 pages.
Mueller, Jennifer, Work Smarter With Smart Tags, Journal of Accountancy (Nov. 2002) pp. 1-9.
Nardi, B. et al., *Collaborative, Programmable Intelligent Agents*, Communications of the ACM, vol. 41, No. 3 (Mar. 1998) 96-104.
Board Decision for Chinese Application No. 200980120203.1 dated May 25, 2017, 15 pages.
Office Action for Chinese Application No. 200980120203.1 dated Feb. 6, 2015.
International Preliminary Report on Patentability and Written Opinion from International Application No. PCT/FI2009/050204, dated Jul. 2, 2009.
Office Action for Indian Application No. 6128/CHENP/2010 dated Dec. 18, 2017, 7 pages.

* cited by examiner

METHOD, APPARATUS AND COMPUTER PROGRAM PRODUCT FOR PROVIDING AN INFORMATION MODEL-BASED USER INTERFACE

TECHNOLOGICAL FIELD

Embodiments of the present invention relate generally to content management technology and, more particularly, relate to a method, device, mobile terminal and computer program product for providing an information model-based user interface.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. As mobile electronic device capabilities expand, a corresponding increase in the storage capacity of such devices has allowed users to store very large amounts of content on the devices. Given that the devices will tend to increase in their capacity to store content, and given also that mobile electronic devices such as mobile phones often face limitations in display size, text input speed, and physical embodiments of user interfaces (UI), challenges are created in content management. Specifically, an imbalance between the development of stored content capabilities and the development of physical UI capabilities may be perceived.

In order to provide a solution for the imbalance described above, metadata and other content management enhancements have been developed. Metadata typically includes information that is separate from an object, but related to the object. An object may be "tagged" by adding metadata to the object. As such, metadata may be used to specify properties associated with the object that may not be obvious from the object itself. Metadata may then be used to organize the objects to improve content management capabilities.

Currently, devices such as mobile terminals are becoming more and more adept at content creation (e.g., images, videos, product descriptions, event descriptions, etc.). However, tagging of objects produced as a result of content creation is typically a challenge given the limited physical UI capabilities of mobile terminals. For example, it may be cumbersome to type in a new metadata entry for each content item created. Accordingly, although tagging objects with metadata improves content management capabilities, the efficiency of tagging may become a limiting factor.

Additionally, some methods have been developed for inserting metadata based on context. Context metadata describes the context in which a particular content item was "created". Hereinafter, the term "created" should be understood to be defined such as to encompass also the terms captured, received, and downloaded. In other words, content is defined as "created" whenever the content first becomes resident in a device, by whatever means regardless of whether the content previously existed on other devices. Moreover, embodiments of the present invention may be practiced on content for which, although the content is stored at a remote device, metadata associated with such content (or miniaturized content (e.g., thumbnails, streams of music, etc.)) may be accessible to a device employing an embodiment of the present invention. Context metadata can be associated with each content item in order to provide an annotation to facilitate efficient content management features such as searching and organization features. Accordingly, the context metadata may be used to provide an automated mechanism by which content management may be enhanced and user efforts may be minimized. However, context metadata and other types of metadata may be standardized dependent upon factors such as context. Thus, tagging of content items that may have, for example, more than one context may become complicated. Furthermore, a user typically has limited control over the context and therefore limited control over tagging of content items according to the user's desires since automated context tagging may be performed in a manner specific to a particular application.

Although the metadata may then be used as a basis for searching for content, due to the varieties of metadata that may be assigned by different users or different applications, it may be difficult to locate content that is otherwise related to a particular root object. Moreover, it may be difficult to associate previously existing content with a particular root object due to a lack of or inconsistencies in the corresponding metadata. Accordingly, mechanisms have recently been developed to enable a robust capability for providing metadata associated with events or applications that correspond with the creation of a particular content item. However, many conventional applications currently store data in application-specific silos. In other words, content items associated with a particular application such as a calendar application, are typically stored in association with other calendar related content items. Meanwhile, content items such as digital photos are typically stored in association with other photo related content items. As such, even though content items associated with different applications may share the same metadata, accessing the respective content items may be cumbersome since the user may be required to first switch to the other application to find the respective content items in the corresponding application-specific silo.

Thus, it may be advantageous to provide an improved method of utilizing associative relationships between content items or data objects, which may provide an ability to access content via an improved user interface.

BRIEF SUMMARY

A method, apparatus and computer program product are therefore provided to enable the utilization of relationships between content items or data objects for improved user interface with respect to accessing related content items. In this regard, embodiments of the present invention may build upon the association of objects by linking events or applications with associated metadata by providing a user interface that may take advantage of such association of objects to enable improved access to such objects regardless of with which application the respective objects may be associated. In particular, a method, apparatus and computer program product are provided that, for a particular object enable informing a user of other objects that are associated with the particular object (e.g., via rule based associations made in relation to metadata). Furthermore, for example, embodiments of the present invention may be configured to provide not only a mechanism by which to inform the user of one or more other objects (e.g., related or associated objects) that are associated with the particular object, but also to enable the user to launch an application (if different than the application associated with the particular object) associated with a selected one of the associated objects. Accordingly, embodiments of the present invention may seamlessly enable access to the selected associated object without requiring the user to separately open the application associated with the associated object.

Embodiments of the invention may provide a method, apparatus and computer program product for advantageous employment in a mobile electronic device environment, such as on a mobile terminal capable of creating content items and objects related to various types of media. As a result, for example, mobile terminal users may enjoy an improved content management capability.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
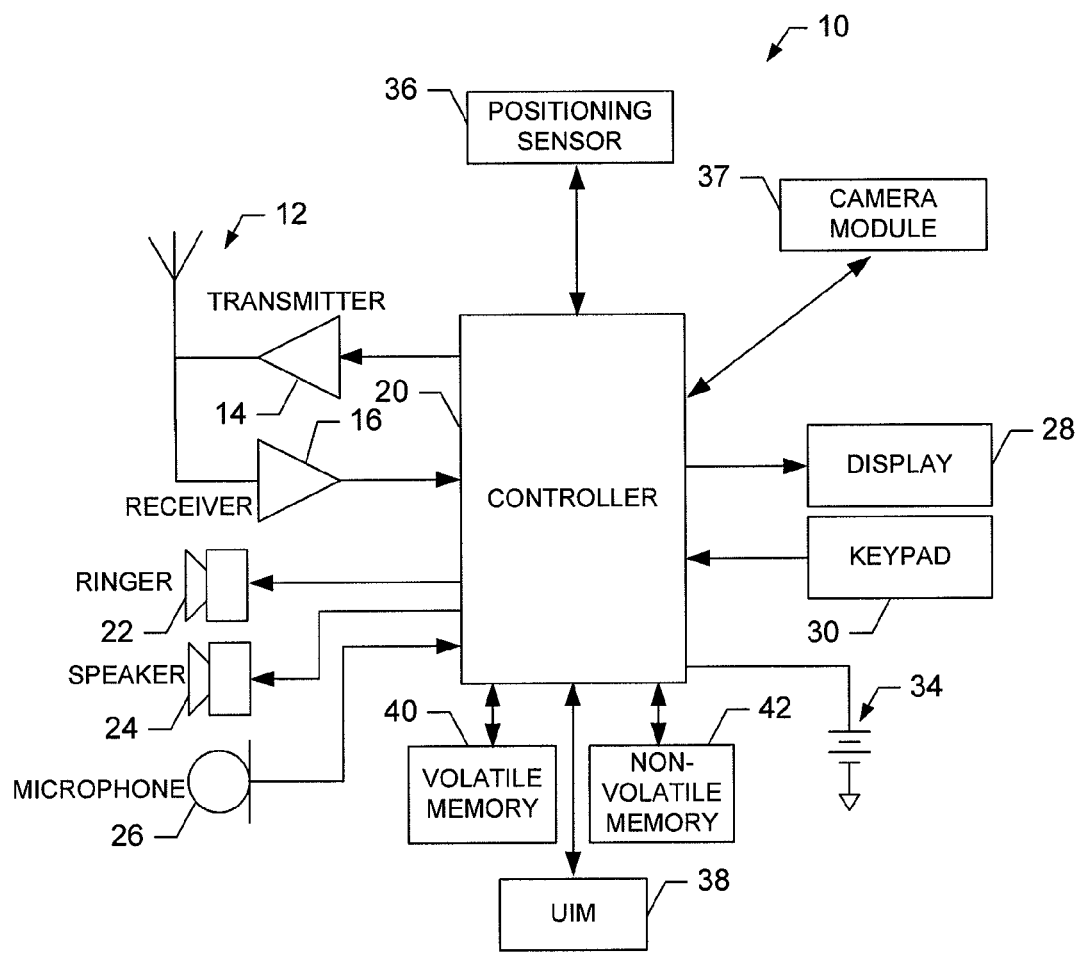
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1, one aspect of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention.

In addition, while several embodiments of the present invention are performed or used by a mobile terminal 10, embodiments may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include a controller 20 or other processing element that provides signals to and receives signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA (time division multiple access)), GSM (global system for mobile communications, and IS-95 (CDMA (code division multiple access)), or with third-generation (3G) wireless communication protocols, such as UMTS (universal mobile telecommunications system), CDMA2000, WCDMA (wideband CDMA) and TD-SCDMA (time division-synchronous CDMA), with fourth-generation (4G) wireless communication protocols or the like.

It is understood that the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output. In addition, the mobile terminal 10 may include a positioning sensor 36. The positioning sensor 36 may include, for example, a global positioning system (GPS) sensor, an assisted global positioning system (Assisted-GPS) sensor, etc. However, in one exemplary embodiment, the positioning sensor 36 includes a pedometer or inertial sensor. In this regard, the positioning sensor 36 is capable of determining a location of the mobile terminal 10, such as, for example, longitudinal and latitudinal directions of the mobile terminal 10, or a position relative to a reference point such as a destination or start point. Information from the positioning sensor 36 may then be communicated to a memory of the mobile terminal 10 or to another memory device to be stored as a position history or location information.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication. In conjunction with the positioning sensor 36, the cell id information may be used to more accurately determine a location of the mobile terminal 10.

In an exemplary embodiment, the mobile terminal 10 includes a media capturing module, such as a camera, video and/or audio module, in communication with the controller 20. The media capturing module may be any means for capturing an image, video and/or audio for storage, display or transmission. For example, in an exemplary embodiment in which the media capturing module is a camera module 37, the camera module 37 may include a digital camera capable of forming a digital image file from a captured image. As such, the camera module 37 includes all hardware, such as a lens or other optical device, and software necessary for creating a digital image file from a captured image. Alternatively, the camera module 37 may include only the hardware needed to view an image, while a memory device of the mobile terminal 10 stores instructions for execution by the controller 20 in the form of software necessary to create a digital image file from a captured image. In an exemplary embodiment, the camera module 37 may further include a processing element such as a co-processor which assists the controller 20 in processing image data and an encoder and/or decoder for compressing and/or decompressing image data. The encoder and/or decoder may encode and/or decode according to a JPEG standard format.

Figure 2:
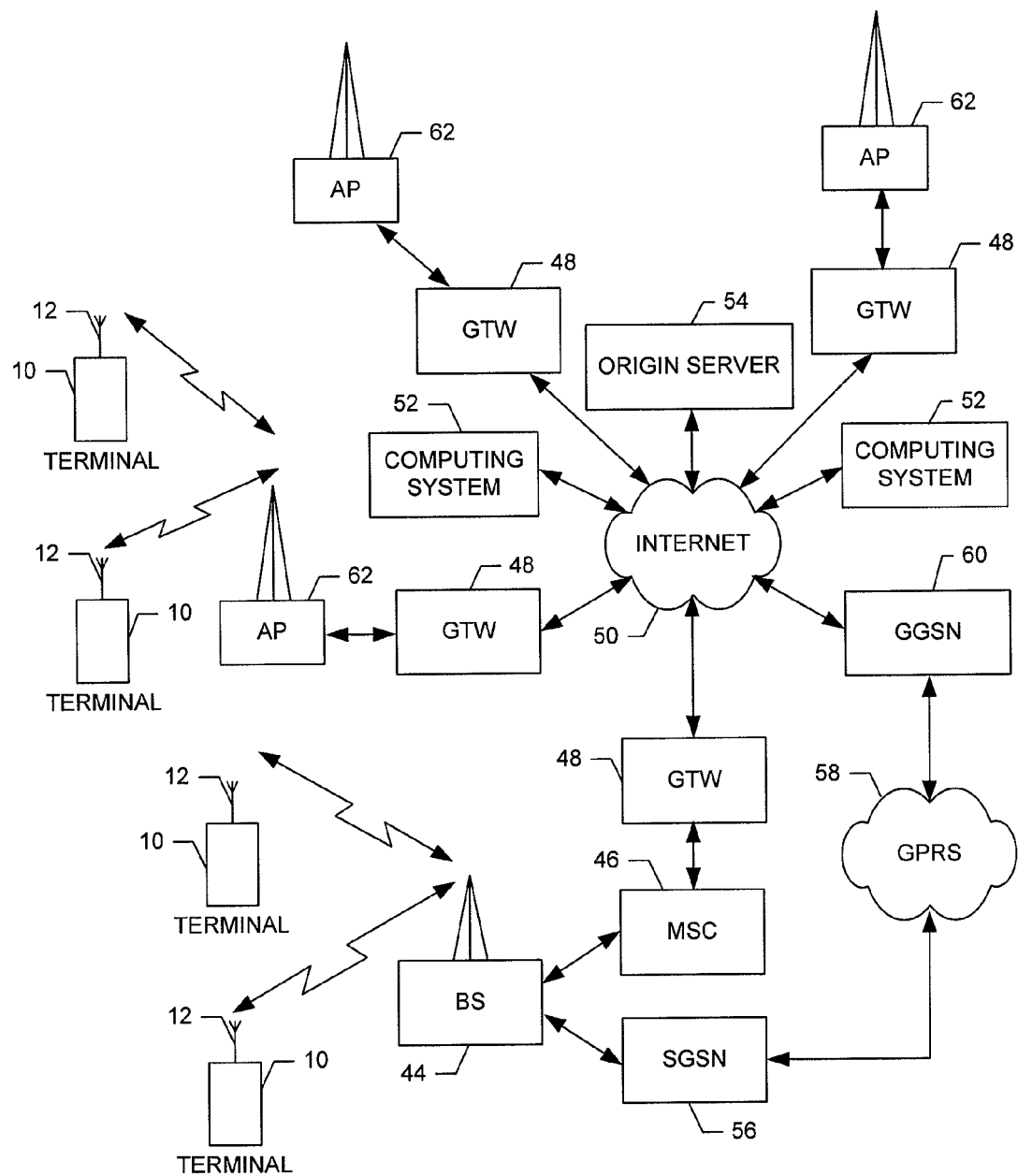
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via the GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content sharing) between the mobile terminal 10 and other mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a camera, server, personal computer or other device, absent any communication with the system of FIG. 2.

An exemplary embodiment of the invention will now be described with reference to FIG. 3, in which certain elements of an apparatus for providing a user interface for utilizing an association of metadata are displayed. The apparatus of FIG. 3 may be employed, for example, on the mobile terminal 10 of FIG. 1. However, it should be noted that the apparatus of FIG. 3, may also be employed on a variety of other devices, both mobile and fixed, and therefore, the present invention should not be limited to application on devices such as the mobile terminal 10 of FIG. 1. For example, the apparatus of FIG. 3 may be employed on a personal computer, a camera, a video recorder, etc. Alternatively, embodiments may be employed on a combination of devices including, for example, those listed above. It should also be noted, however, that while FIG. 3 illustrates one example of a configuration of an apparatus for providing content tagging for use, for example, in metadata-based content management utilizing a user interface configured to enable access to content from various different applications using associations of objects based on the metadata, numerous other configurations may also be used to implement embodiments of the present invention.

Figure 3:
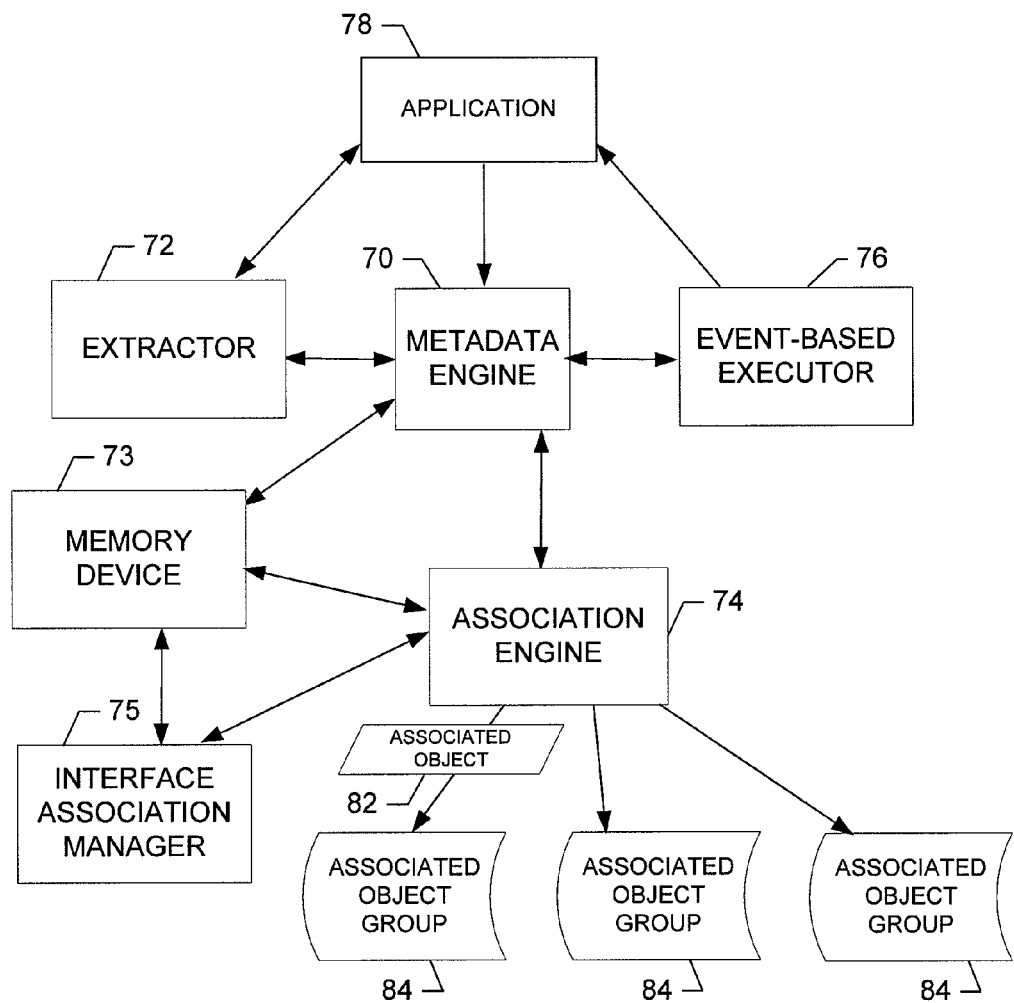
FIG. 3 illustrates a block diagram of portions of an apparatus for providing an information model-based user interface according to an exemplary embodiment of the present invention.

Referring now to FIG. 3, an apparatus for providing an information model-based user interface is provided. The apparatus may be embodied in hardware, software or a combination of hardware and software for use by a device such as the mobile terminal 10. The apparatus may include a metadata engine 70, an extractor 72, and an association engine 74. In an exemplary embodiment, the apparatus may also include a memory device 73, an interface association manager 75 and/or an event-based executor 76. The memory device 73 may include, for example, volatile and/or non-volatile memory (e.g., volatile memory 40 and/or non-volatile memory 42). The memory device 73 may be configured to store information, data, applications, instructions or the like for enabling the apparatus to carry out various functions in accordance with exemplary embodiments of the present invention. For example, the memory device 73 could be configured to buffer input data for processing by a processing element (e.g., the controller 20). Additionally or alternatively, the memory device 73 could be configured to store instructions for execution by the processing element. As yet another alternative, the memory device 73 may be one or more of a plurality of databases that store information in the form of static and/or dynamic information.

One or more of the metadata engine 70, the extractor 72, the association engine 74, the interface association manager 75 and the event-based executor 76 may be in communication with an application 78 being executed, for example, by a processing element of the device employing the system (e.g., the controller 20). In an exemplary embodiment, the application 78 may be in communication with at least the metadata engine 70 to enable the metadata engine 70 to generate metadata for content created in response to execution of the application 78. For example, the application 78 may import a file, capture an image or video sequence, download a web page, generate a document, etc., to create an object which may include any type of content and the metadata engine 70 may assign metadata to the created object for storage in association with the created object. In an exemplary embodiment, the metadata engine 70 may be in simultaneous communication with a plurality of applications and may generate metadata for each corresponding application. Examples of applications that may be in communication with the metadata engine 70 may include without limitation phonebook, document creation, e-mail client or server, calendar, gallery, image and or video camera application or module, media player, messaging client or server, SMS or MMS applications, instant messaging applications, location client or server, calculator and other like applications that can handle media items.

Each of the metadata engine 70, the extractor 72, the association engine 74, the interface association manager 75 and the event-based executor 76 may be embodied as any device or means embodied in either hardware, software, or a combination of hardware and software that is capable of performing the corresponding functions of the metadata engine 70, the extractor 72, the association engine 74, the interface association manager 75 and the event-based executor 76, respectively, as described in greater detail below. As such, the metadata engine 70, the extractor 72, the association engine 74, the interface association manager 75 and the event-based executor 76 may each be controlled by or otherwise embodied as the processing element (e.g., the controller 20). Processing elements such as those described herein may be embodied in many ways. For example, the processing element may be embodied as a processor, a coprocessor, a controller or various other processing means or devices including integrated circuits such as, for example, an ASIC (application specific integrated circuit) or an FPGA (field programmable gate array).

It should be noted that any or all of the metadata engine 70, the extractor 72, the association engine 74, the interface association manager 75 and the event-based executor 76 may be collocated in a single device. For example, the mobile terminal 10 of FIG. 1 may include all of the metadata engine 70, the extractor 72, the association engine 74, the interface association manager 75 and the event-based executor 76. Alternatively, any or all of the metadata engine 70, the extractor 72, the association engine 74, the interface association manager 75 and the event-based executor 76 may be disposed in different devices. For example, one or more of the metadata engine 70, the extractor 72, the association engine 74, the interface association manager 75 and the event-based executor 76 may be disposed at a server or remote display, while others are disposed at a mobile terminal in communication with the server or remote display.

The extractor 72 may be any device or means embodied in either hardware, software, or a combination of hardware and software configured to extract event and/or metadata related information from objects associated with the application 78 (or with information gathered from one or more other applications). In this regard, for example, if an event is detected at the extractor 72 such as creation of an image or other visual media (e.g., by taking a picture with the camera module 37), the extractor 72 may communicate the event information to the metadata engine 70 for assignment of metadata to the object associated with the event information. As an alternative (or as an additional feature), the extractor 72 may be configured to extract metadata from existing content or objects or newly acquired content or objects. Thus, for example, if an embodiment of the present invention is installed on an existing device, the extractor 72 may extract metadata from the stored content of the device for association of the content as described below. Alternatively, if a device practicing an embodiment of the present invention is placed in communication with a memory having content or objects stored therein that were not associated via their corresponding metadata, the extractor 72 may extract metadata from the content or objects stored therein for association of the content or objects in accordance with embodiments of the invention. As such, the extractor 72 may be configured to make recollections of earlier events. In any case, event and/or metadata information extracted by the extractor 72 may be communicated to the metadata engine 70.

In an exemplary embodiment, the metadata engine 70 may be any device or means embodied in either hardware, software, or a combination of hardware and software configured to generate metadata according to a defined set of rules. The defined set of rules may provide, for example, the metadata that should be assigned to content created using one or more of the applications. In response to receipt of event and/or metadata information from the extractor 72, the metadata engine 70 may be configured to communicate such received information to the association engine 74.

The association engine 74 may be any device or means embodied in either hardware, software, or a combination of hardware and software configured to determine if the event and/or metadata information is associated with a predefined rule set stored in association with the association engine 74 (e.g., at the memory device 73). In an exemplary embodiment, the association engine 74 may be configured to consider whether to make associations as described below in response to the occurrence or detection of an event (e.g., a mobile phone event). As such, for example, in response to an event, if the event and/or metadata information are associated with a rule of the predefined rule set, the association engine 74 may be configured to define the corresponding object as an associated object 82 by adding the corresponding object to an associated object group 84. Each associated object group 84 may be a subset of objects that are related via metadata and/or event information. Thus, for example, a subset of objects may be related or associated with each other by virtue of sharing a particular characteristic or event such as being created on a given day, during a particular calendar event, in a particular location, at a particular time, in the presence of a particular individual, including a particular person or item, etc., any of which may be stored in association with each of the subset of objects as metadata that may have been, for example, extracted by the extractor 72 or inserted by the metadata engine 70.

In an exemplary embodiment, each associated object could be stored in a folder embodying the associated object group 84. However, alternatively, data identifying each object associated with a associated object group 84 may be stored. As such, for example, data may be stored in the memory device 73 such that the data is not in application specific silos. In this regard, for example, data may be stored based on a relationship of the data to other objects regardless of with which application such objects are associated. As an alternative, additional data may be stored in association with each object that may otherwise be stored in an application specific silo. The additional data may, for a particular object, point to other objects, any of which may be associated with the same or different applications, sharing metadata or a particular tag with the particular object. As yet another alternative, the additional data may be indicative of a storage location of a listing or database including pointers to the memory locations of various objects that may be associated with the same or different applications, but share the same metadata or particular tag with the particular object.

As a more specific example, a calendar application may specify a calendar event of a weeklong vacation. All content or objects created during the vacation may be defined by the association engine 74 as associated objects with regard to each other on the basis of the shared event between such created content or objects (i.e., occurrence during the vacation). In other words, the association engine 74 may include a rule to associate all content created during a particular time period (e.g., the time period designated to correspond to the vacation) as associated objects under a root term of "vacation". Furthermore, if one particular portion of the vacation was spent in Paris, the association engine 74 may be configured to utilize location information (e.g., context metadata or location history) as the basis for associating content items created in Paris. Accordingly, if a root metadata object of "Vacation" were selected, all associated objects of the associated object group sharing metadata or event information associated with the vacation (e.g., all objects created during the period that the calendar application designated as corresponding to the vacation) may be displayed. Meanwhile, in response to selection of a root metadata object of "Paris", a subset of the vacation related objects (e.g., those objects created at the location corresponding to Paris) may be displayed. Physical storage of any objects created may be in accordance with any suitable format including, for example, any one of the mechanisms described above.

According to an exemplary embodiment of the present invention, the device employing the apparatus may include an ontology describing all object types for applications on the device. Accordingly, a predefined metadata schema defined according to the ontology may be utilized for enabling integration of objects created using any of the applications. The association engine 74 may be configured to use the predefined metadata schema in connection with associating objects as associated objects by assigning such objects to metadata subgroups (e.g., an associated object group 84) based on the predefined rule sets. As another alternative, a user of the apparatus may be enabled to provide definitions for associations to be made. In this regard, for example, the user may utilize a user interface of the apparatus to define association types to be employed by the association engine 74. The definition of associations or association types may be provided, for example, by accessing a menu item enabling the provision of such information.

The predefined rule sets may include at least a root object definition and a limit for the associated object. The root object definition may be determined at least in part by the ontology employed by the system. In an exemplary embodiment, the root object definition may be a contact object and the limit may be a timeline value. In other words, for example, every contact object may be defined to be associated in an associated object group 84 if such contact object includes an event and/or metadata object that occurred or was created during a defined timeframe corresponding to the timeline value. As described above, the timeline value could be defined for particular calendar events. It should be noted that an event responsive to which the metadata engine 70 and/or the association engine 74 operate need not be a real-time occurring event. In other words, an event responsive to which the metadata engine 70 and/or the association engine 74 operate may be a past event. As such, for example, embodiments of the invention may operate retroactively on previously created content. In some exemplary embodiments, the user or a timing related function may provide an instruction to initiate metadata assignment or the operation of the association engine 74 in accordance with a user generated event or even a past event.

Accordingly, based on the information above, embodiments of the present invention may provide for data extraction related to created objects. The extracted data which may include metadata and/or event information may then be used to define associated objects on the basis of a predefined rule set. In this regard, the metadata may include event information. The associated objects may be objects that are associated with each other on the basis of sharing a characteristic or event as indicated by the corresponding metadata. The associated objects may then be stored as or otherwise associated with a corresponding predefined group (e.g., an associated object group), which may be a metadata subgroup according to some embodiments. By associating objects into associated object groups, functions may be more easily performed with regard to the objects. For example, associated objects may be used to generate new view models for existing core applications of the mobile terminal 10. As an example, a gallery may produce a new type of view automatically such that images can be sorted based on time, location, persons in an image, etc. As another example, an inbox may create a new view of messages based on a person or collection of persons such as colleagues, or based on time. Such functionality may be performed by the processing element of the mobile terminal or other device employing embodiments of the present invention.

As stated above, an exemplary embodiment may include the event-based executor 76. The event-based executor 76 may be any device or means embodied in either hardware, software, or a combination of hardware and software configured to interact with the application 78 in order to define application actions based on event and/or history data. In this regard, for example, the event-based executor 76 may be configured to create automatic notes based on collected metadata information. An example of automatic note taking may include creating a document, such as a log, that records and/or includes all events and/or objects performed during a particular timeline period or event. For example, if a calendar event is provided to cover a particular time period, any events occurring and/or objects created may be logged during the meeting. Accordingly, a single document (e.g., a meeting log) may be viewed as a root object and all associated events and/or objects that were logged in connection with the meeting may be viewed, for example, in timeline order.

The event-based executor 76 may also or alternatively be configured to enable the mobile terminal 10 (or whatever device employs embodiments of the present invention) to perform automatic actions based on historical data. In this regard, a record of events may be stored (e.g., such as via the logging function above) which may record a series of events and an action taken or result of the series of events. A rule may be determined with regard to the series of events, for example, in response to a predetermined number of occurrences of the series of events in which the same action taken or result occurs. Accordingly, in response to the event-based executor 76 determining that the series of events has currently occurred, the event-based executor 76 may invoke the rule to instruct the application 78 or the mobile terminal 10 to take the corresponding action or achieve the corresponding result proscribed according to the rule. As an example, if a user sets the profile of the mobile terminal 10 to "work" when the user arrives at work, the event-based executor 76 may recognize, after a predetermined number of occurrences of the series of events defined by a location application determining arrival at the user's work and subsequent changing of the profile, that once the arrival of the user at work is determined by the location application, the profile should automatically be changed to "work". Time or other considerations and/or actions may also be considered in addition to or instead of location criteria.

The interface association manager 75 may be any device or means embodied in either hardware, software, or a combination of hardware and software configured to, for a particular object (e.g., file, calendar event, content item, etc.), provide for informing a user of other objects that are associated with the particular object. Furthermore, for example, the interface association manager 75 may be configured to provide not only a mechanism by which to inform the user (e.g., a human user of the mobile terminal 10) of one or more other objects (e.g., associated objects) that are associated with the particular object, but also to enable the user to launch an application (if different than the application associated with the particular object) associated with a selected one of the associated objects, to thereby seamlessly enable access to the selected associated object without requiring the user to separately open the application associated with the associated object. In some embodiments, the interface association manager 75 may be embodied as the event-based executor 76. In other words, the automatic action performed by the event-based executor 76 based on metadata may be the provision, for display, of information indicative of associated (or related) objects that are associated to a particular object and the enablement of accessing any selected one of such associated objects by the launching of a respective associated application that corresponds to the selected associated object. Accordingly, the interface association manager 75 may be configured to provide a user interface including a display of a mechanism by which to view related or associated objects that are associated with a particular object (e.g., via associations made, for example, based on metadata defining a common event, application, situation, etc., between objects). The user interface may also be used to access a selected associated object and launch the application, if needed, associated with the selected associated object.

Figure 4A:
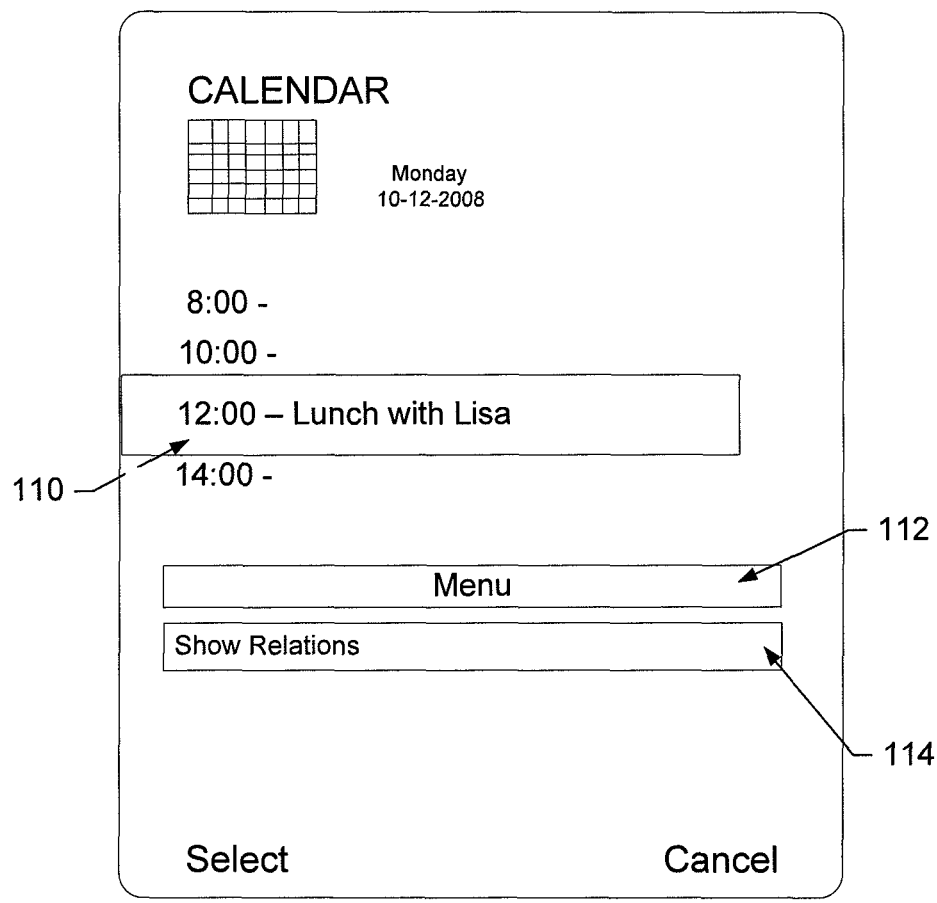
FIGS. 4A, 4B and 4C illustrate an example of operation of an interface association manager according to an exemplary embodiment of the present invention.
Figure 4B:
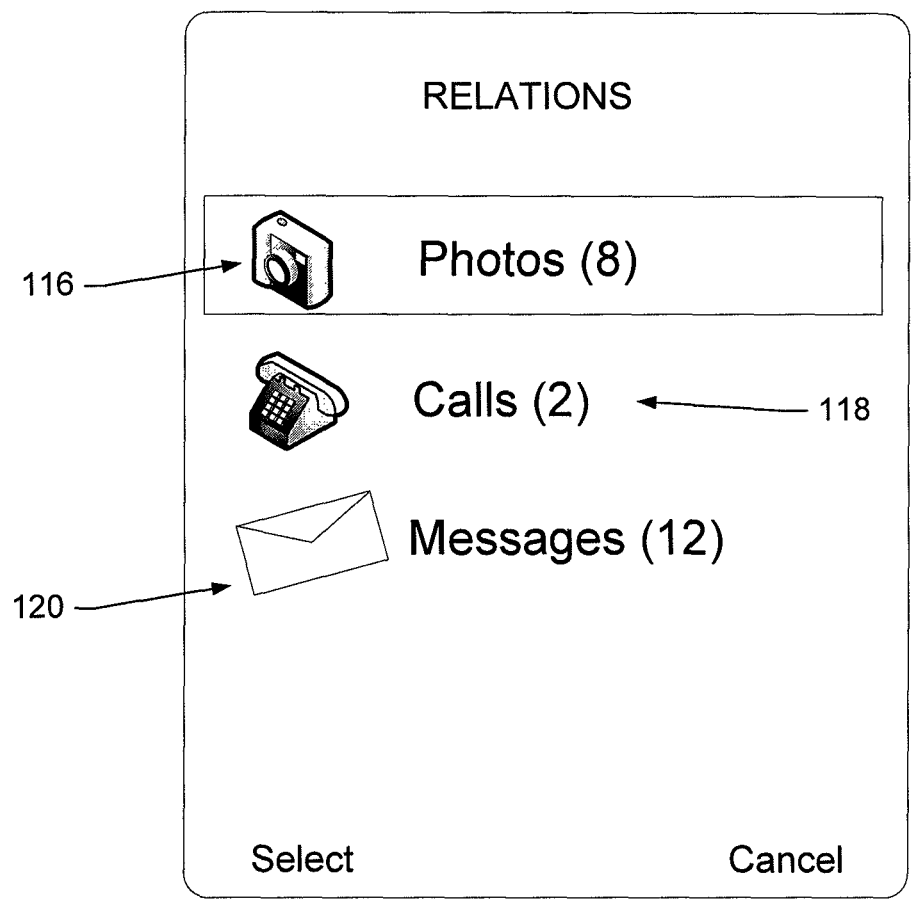
Figure 4C:
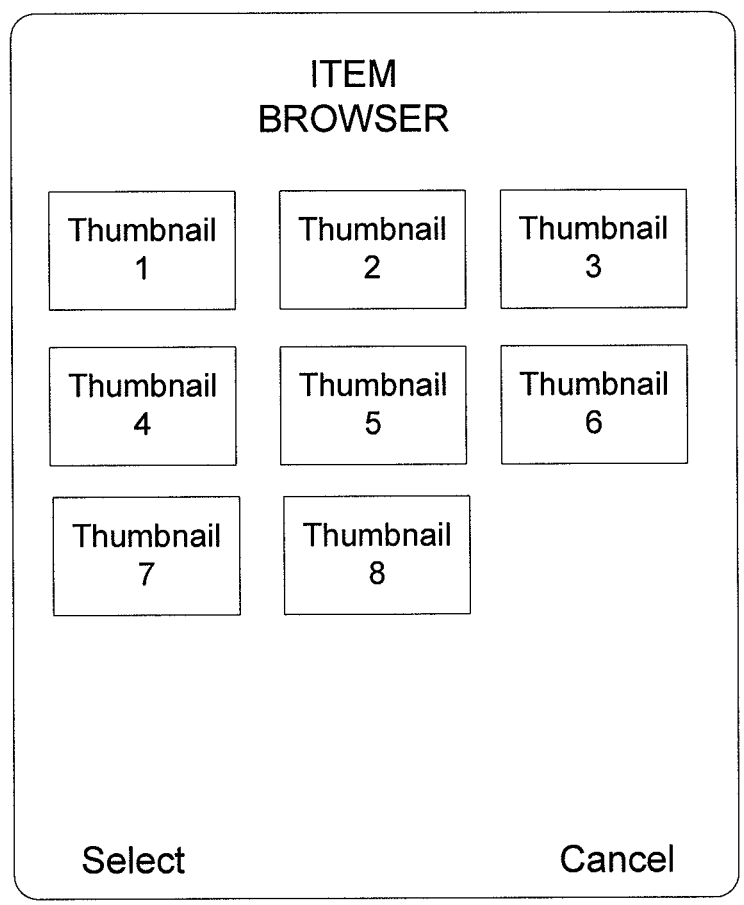

FIGS. 4A, 4B and 4C illustrate an example of operation of the interface association manager 75 according to an exemplary embodiment of the present invention. In this regard, FIG. 4A may be considered a first or highest level of a hierarchical structure for presenting objects for selection based on associations made with respect to metadata of each of the objects. As such, it should be understood that associations between various objects may be made and stored (e.g., in the memory device 73) on the basis of metadata associated with each of the objects. Thus, for any particular object that is highlighted or selected, the user may be enabled to view related objects (e.g., via the associations) to the selected object. The user may then select one of the related objects and the selected related object may be accessed by launching the corresponding application of the selected related object if the corresponding application is different than the application associated with the selected object to which the selected related object is related.

As shown in FIG. 4, the interface association manager 75 may be made aware of which object is the selected object (e.g., selected object 110, which happens to be a calendar entry for a calendar application that is related to a particular person named Lisa) at any given time. As indicated above, the selected object could merely be a highlighted object, rather than actually being selected, in some cases. The interface association manager 75 may communicate with the association engine 74 and/or the memory device 73 to access information related to associations for the selected object 110. As such, the selected object 110 may correspond to a single associated object (e.g., associated object 82 from FIG. 3) and the associated object group 84 with which the selected object is associated may be accessed. In some embodiments, a menu function 112 may be selectable by the user (e.g., using the user interface of the mobile terminal 10) and, responsive to selection of the menu function 112, a plurality of menu items may be presented. Only one such menu item is shown in FIG. 4A for exemplary purposes. In this regard, a show relations menu item 114 is shown in FIG. 4A, the selection of which may provide a display of relationship data corresponding to the selected object 110.

Although FIG. 4A illustrates an example in which the user interface includes a menu function 112 to enable access to the show relations menu item 114, relationship data could also be accessed in ways other than using menu navigation. For example, a particular hard or soft key may be provided to enable more direct access to relationship data. As such, for any given object, selection of a particular key may automatically provide relationship data for the given object without using a menu. After access is provided to the relationship data, the user may browse through the relationship data and select items for presentation regardless of the application associated with the selected items as described below.

In some embodiments, the relationship data corresponding to the selected object 110 may include an indication of objects in the associated object group 84 (e.g., corresponding to the associated object 82) of the selected object 110. The relationship data may therefore include a listing of objects that have an association based on metadata, as described above, with the selected object 110. In some cases, the relationship data corresponding to the selected object 110 may include objects that may be associated with one or more different applications. An icon, letter, character, designator, color, border or shading scheme or other indicator may be used to differentiate the applications with which each of the associated objects are associated. As an alternative, as shown in FIG. 4B, a display of an indication of the different applications that include associated objects and a corresponding indication of the number of objects within each different application group that are associated objects may be presented. In this regard, as shown in FIG. 4B, a first application group 116 corresponding to a media player or gallery application may include a specified number of photos that are related to the selected object 110 (e.g., eight photos in this case), a second application group 118 corresponding to a telephone application may include a specified number of calls that are associated objects relative to the selected object 110 (e.g., two calls in this case), and a third application group 120 corresponding to a message application may include a specified number of, for example, email, (short message service) SMS or text messages that are related to the selected object 110 (e.g., twelve messages in this case).

Using the exemplary selected object 110 of FIG. 4A (e.g., a noon lunch appointment with Lisa), it may be assumed that the calls, messages and/or pictures (e.g., related objects or associated objects) are related to the selected object 110 by virtue of an association made based on metadata. As such, for example, any of the related objects may be calls, messages or pictures from or including metadata indicative of an association with Lisa. Alternatively, the related objects could be associated with other lunch dates or other events that occurred at noon on a particular date or another date. Furthermore, other metadata such as location, proximate devices, or any of the other metadata associations that may be made in the manner described above, may be the subject of an association made between the selected object 110 and the related objects.

In an exemplary embodiment, whether a plurality of the related objects themselves are presented, or (as shown in FIG. 4B) an indication of the applications having related objects is shown, selection of a particular related object that is associated with an application different than the application associated with the selected object 110 (e.g., the calendar application), may cause the different application to be launched so that the particular related object may be rendered or otherwise accessed. As shown in FIG. 4B, in one embodiment, the selection of a respective application group (e.g., the first application group 116) may further provide a presentation of the related objects associated with the respective application group. Thus, for example, if the first application group 116 is selected, the corresponding eight related objects may be presented as shown in FIG. 4C. In FIG. 4C, the eight related objects are shown as eight corresponding thumbnail photos. The user may then select any of the thumbnails for full viewing (e.g., via an image browsing application). As an alternative, in response to selection of the first application group 116, each related object (e.g., each content item in the group) may be presented individually and the user may be enabled to cycle through each item in the group (e.g., using a forward/back navigation mechanism). As yet another alternative, the related objects in the group may be presented in a list format after selection of a corresponding application group (e.g., the calls or messages and information related thereto may be presented in a list). Notably, if a particular one of the objects (e.g., one of the thumbnails) has more than one metadata tag (e.g., a tag corresponding to a different grouping), embodiments of the present invention may enable the user to navigate among objects related to the particular one of the objects on the basis of a selected different metadata tag.

In an exemplary embodiment, the presentation of related items may not require application switching. In other words, a user (e.g., a user of the mobile terminal 10) may be enabled to browse related items, including related items associated with different applications, without switching to execution of the respective applications in order to enable the browsing. As such, the information browsed may merely be information indicative of the respective related items. Thus, the user may be enabled to select one among a plurality of related objects as the selected related object from among the browsed related objects without executing an application corresponding to the browsed objects until the application associated with the selected related object is executed.

Figure 5A:
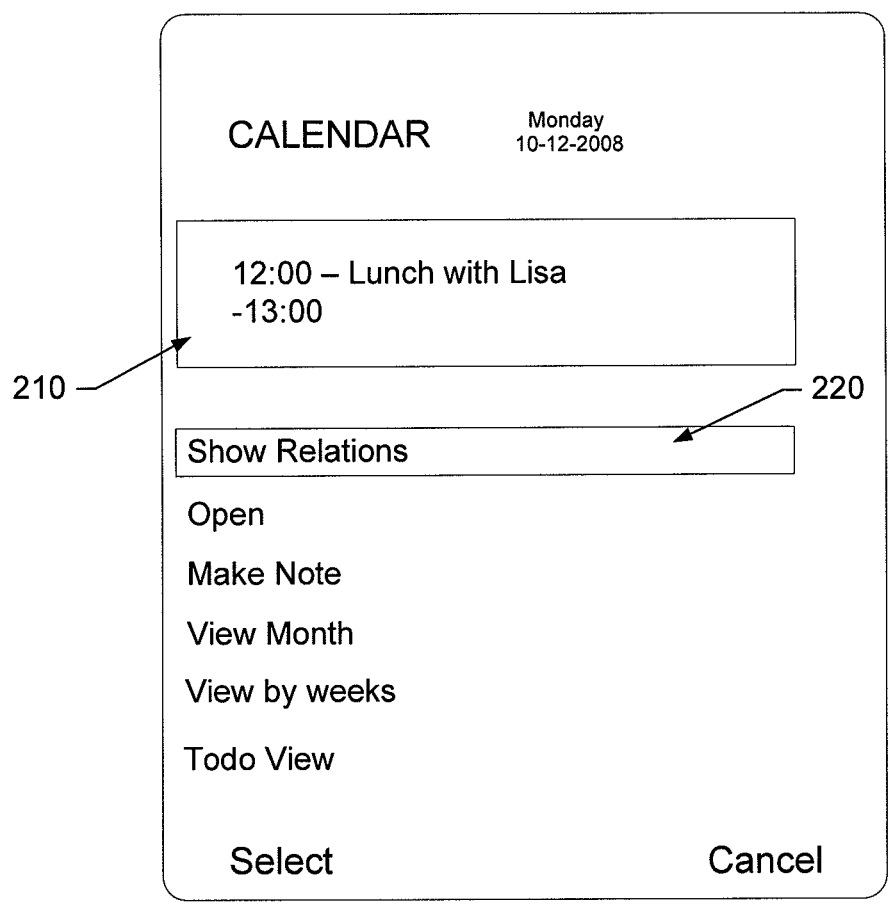
FIGS. 5A, 5B and 5C illustrate another example of operation of an interface association manager according to an exemplary embodiment of the present invention.
Figure 5B:
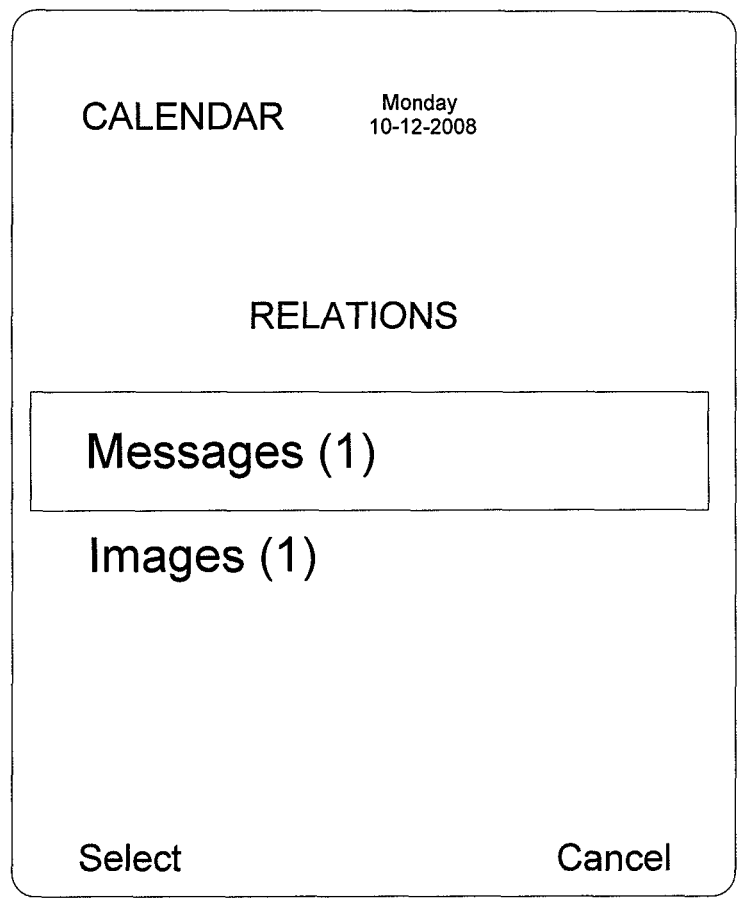
Figure 5C:
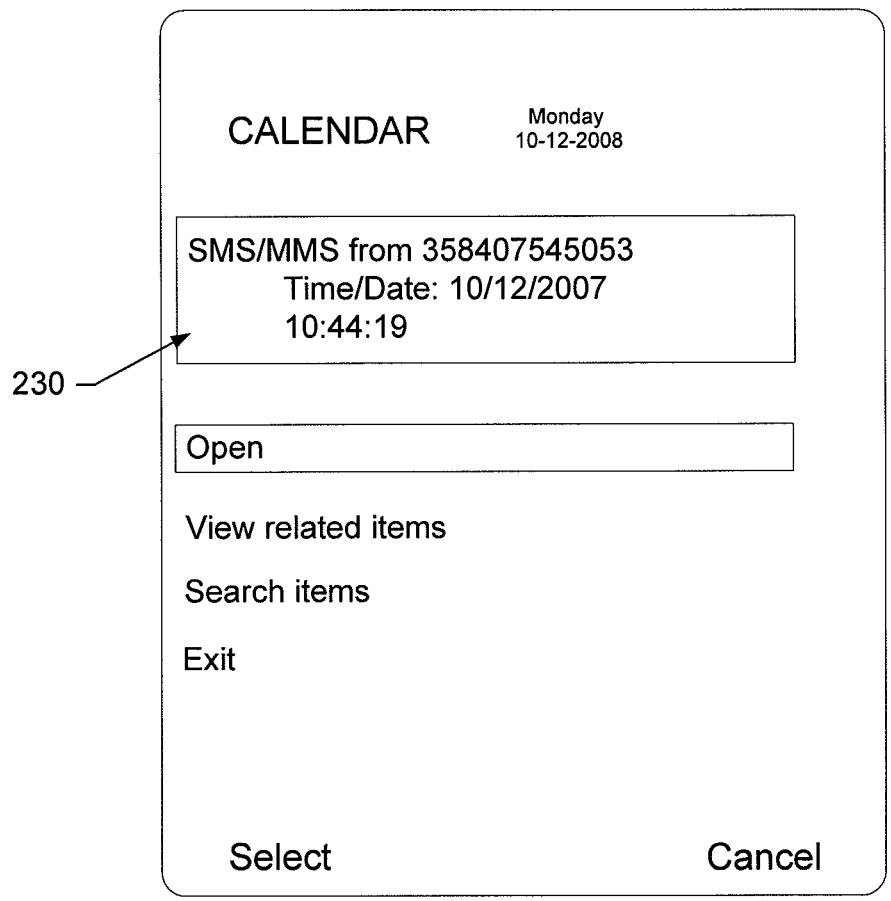

FIGS. 5A, 5B and 5C illustrate another example of operation of the interface association manager 75 according to an exemplary embodiment of the present invention. In the example of FIG. 5A, a selected object 210 is again a calendar entry. However, it should be recognized that the selected object could be an object associated with any of a plurality of different applications. In response to selection of the selected object 210, a menu listing is provided in which "show relations" function 220 is one option. Other options for manipulation of the selected object 210 are also provided. In response to selection of the show relations 220 function, an indication of the application groups (e.g., image and message applications as shown in FIG. 5B) and corresponding numbers of related objects in each group may be provided as shown in FIG. 5B. In response to selection of one of the groups (e.g., the message group), the respective related object 230 or objects may be presented along with a provision of options for functions to be performed with respect to the related object. For example, as shown in FIG. 5C, the related object 230 may be opened or items related to the related object 230 may be viewed. As another alternative, a search may be initiated.

Although not shown in FIG. 5C, further menu options may also be provided by the interface association manager 75. For example, the interface association manager 75 may provide a function option, the selection of which may enable the user to change associations. In this regard, the user may be enabled to add associations or notes or annotations with regard to objects or their respective associations. Alternatively, the user may be enabled to delete associations or modify objects and/or their associations.

As such, the interface association manager 75 may provide embodiments of the present invention with a capability to create an information model based on relationships between objects that may otherwise seem unrelated (e.g., due to such objects being associated with different applications) to enable the accessing of related objects regardless of the application with which such objects are associated. Accordingly, the relationships or associations of objects to one another may provide a mechanism by which the related objects may be accessed by smoothly moving between applications. More specifically, while executing a particular application in relation to a particular object created and/or used in the particular application, the user may switch to execution of another application in order to access an object related to the particular object. The accessing of the related object may be accomplished via relationship data associated with the particular object. Thus, an information model-based user interface may be provided as an alternative to the conventional application based user interface in which a user is required to explicitly move from one application to another when searching content items related to some data or information. Boundaries between applications may therefore be less pronounced and the memory device 73 may be accessed in a manner similar to an associative memory.

In an exemplary embodiment, the interface association manager 75 may further enable the user to create high level objects or topics and collect related information around the object or topic. The related information may be associated with the high level object via associations automatically or manually made. As such, the user can manually add, change, delete, or otherwise modify relationships or associations between objects. In this regard, as indicated above, the user may utilize menu options and/or keyboard or other user interface entry mechanisms to define relationships between objects and/or manage data related to such relationships. These manual manipulations may supplement automatic associations carried out by the association engine 74. Additionally, the manual manipulations may include or otherwise provide rules to the association engine 74 for use in associating objects.

In some embodiments, the apparatus of FIG. 3 may be further configured to initiate a search of a communication network for objects related to the particular object based on metadata extracted from content accessible via the communication network. Accordingly, for example, the apparatus (e.g., via the metadata engine 70 and the extractor 72) may be configured to extract metadata from news articles or other media content and, if the metadata extracted corresponds to existing rules, the objects may be associated with the particular object as related objects. As such, the association engine 74 may generate relationship data associating at least one of the objects with the particular object. The stored association may include a pointer (e.g., a uniform resource locator (URL) or other address) for one or more of the related objects so that the objects may be accessed by linking to such objects if the user selects a corresponding object.

Figure 6:
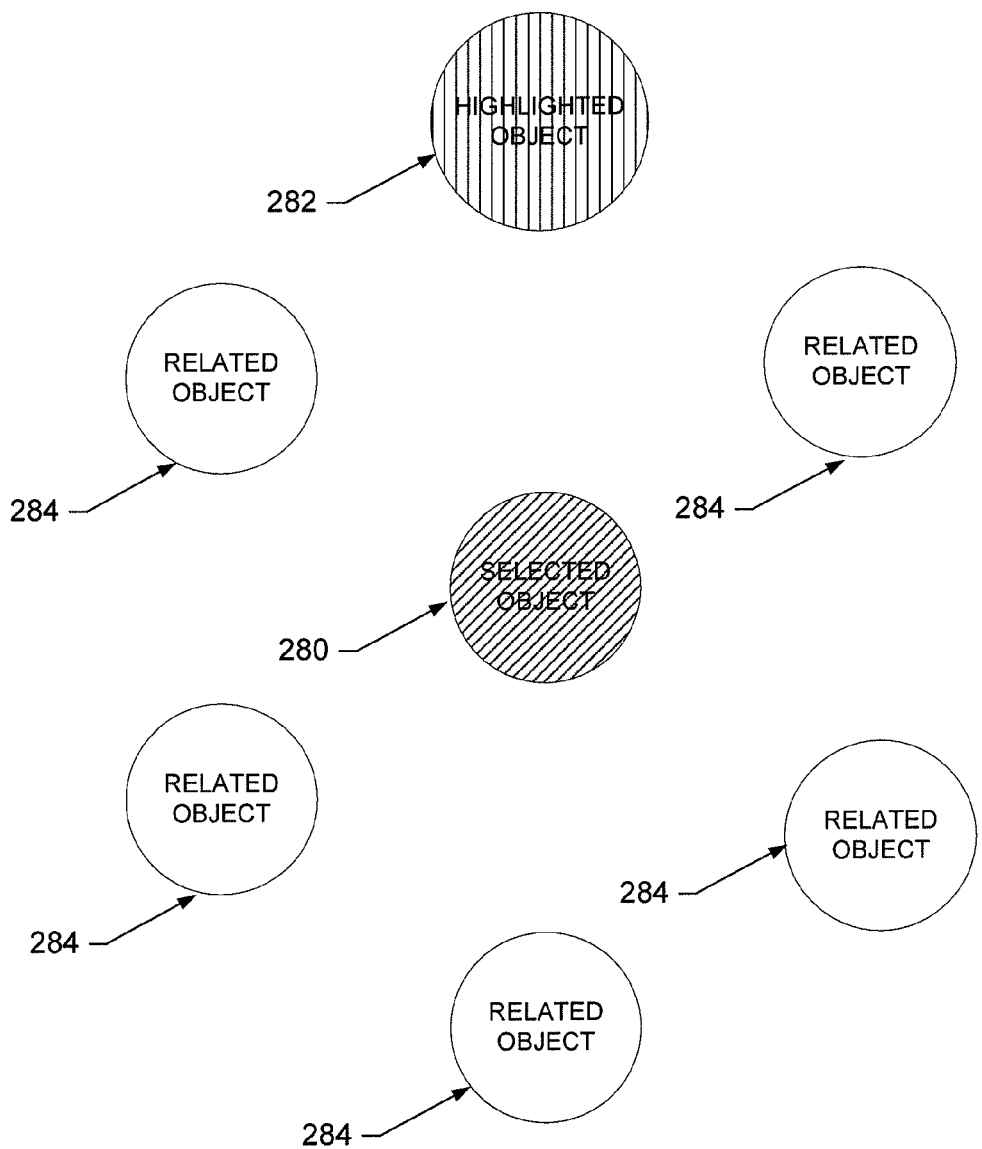
FIG. 6 illustrates an example of a user interface for showing associations between objects according to an exemplary embodiment of the present invention.

Associations between related objects may be presented in numerous ways. For example, objects that are related may be presented in a list format or a plurality of other formats. As one example of an alternative format, FIG. 6 provides a carousel approach to displaying related objects. In this regard, a currently active or selected object 280 may be displayed in a central location with respect to objects related thereto. Meanwhile, the related objects 284 may be displayed in a carousel fashion (e.g., being displayed in a circle format forming a ring around the selected object 280. The related objects 284 may then be reviewed by the user. In an exemplary embodiment, each of the related objects 284 may be a miniature representation of the related object (e.g., a thumbnail). However, a title, theme, extracted portion of the actual object, metadata of the related object, etc. may also or alternatively be presented. In one exemplary embodiment, a cursor may be used to scroll around to or highlight the various different related objects. In some instances, more detailed information about a highlighted associated object 282 may be presented to the user in response to highlighting the highlighted associated object 282. In some embodiments the highlighted associated object 282 may always be rotated to a fixed or prominent position in the carousel (e.g., top center position). However, in an alternative embodiment, the position of the related objects 284 may remain fixed relative to the selected object 280 and the cursor may be moveable to rotate around the carousel to highlight respective highlighted related objects.

Figure 7:
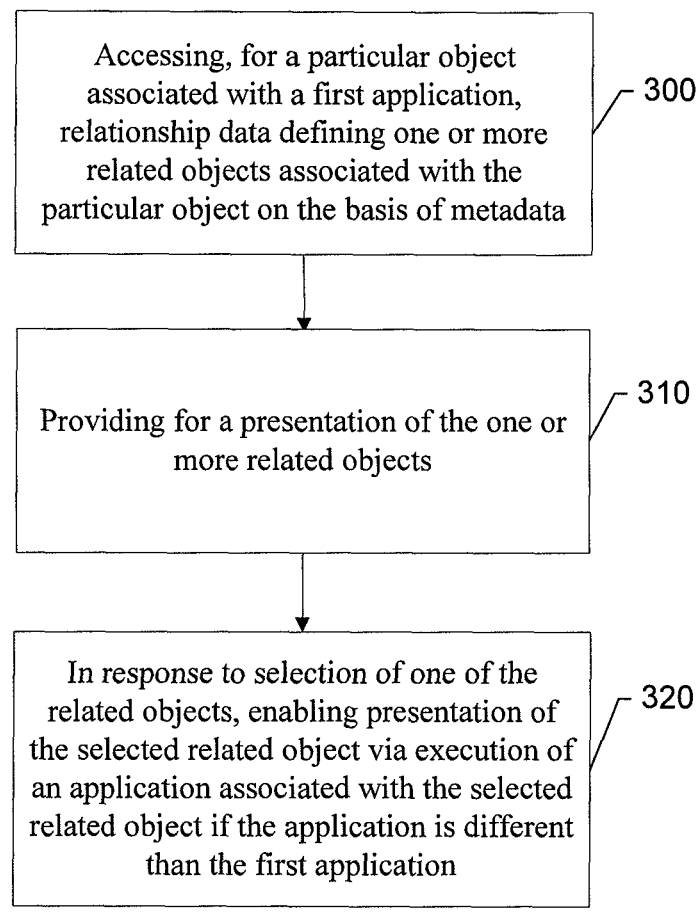
FIG. 7 is a flowchart according to an exemplary method for providing an information model-based user interface according to an exemplary embodiment of the present invention.

FIG. 7 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for utilizing an association of objects using metadata for providing an improved user interface may include accessing, for a particular object associated with a first application, relationship data defining one or more related objects associated with the particular object on the basis of metadata at operation 300. A presentation of the one or more related objects may be provided at operation 310. The presentation may be by display of information indicative of the related objects. At operation 320, in response to selection of one of the related objects, presentation of the selected related object may be enabled via execution of an application associated with the selected related object if the application is different than the first application.

In an exemplary embodiment, providing for the presentation of the one or more related objects may include presenting a plurality of related objects including an indication of which application type is associated with each respective one of the related objects. In other words, application type groupings of the related objects may be rendered. The application type groupings may enable browsing of related objects associated with various different applications. In other words, a user may be enabled to view which different applications have objects associated therewith that are related objects. In an exemplary embodiment, the method may further include an operation for enabling a user to select the one of the related objects as the selected related object from among the browsed related objects without executing an application corresponding to the browsed objects until the application associated with the selected related object is executed. In other words, the user can view indications or information indicative of the related objects without executing an application associated with the objects being browsed. A change in the application being executed may then occur when one of the browsed objects is selected.

In an exemplary embodiment, providing for the presentation of the one or more related objects may include providing for the presentation of an indication of each application having related objects associated therewith. In some embodiments, the method may further include providing an indication of a number of related objects corresponding to each application. In some embodiments, the user may be enabled to modify the relationship data.

In an exemplary embodiment, accessing relationship data may include accessing stored information defining each object that has been associated with the particular object based on a predefined rule set and in response to an event. Additionally or alternatively, some embodiments may include initiating a search of a communication network for objects related to the particular object based on metadata extracted from content accessible via the communication network and generating relationship data associating at least one of the objects with the particular object prior to the operation of accessing relationship data.

It should be noted that although exemplary embodiments discuss objects or content items, such objects may be, without limitation, image related content items, video files, television broadcast data, text, web pages, web links, audio files, radio broadcast data, broadcast programming guide data, location tracklog, etc. Additionally, it should be understood that, according to an exemplary embodiment, events as referred to herein may correspond to any event possible in a mobile phone. In this regard, in addition to events related to content creation, other events such as answering or placing a call, sending or receiving an SMS, establishing or terminating a communication session (e.g., voice over IP (VoIP), push-to-talk (PTT), etc.) and other like events may all be within the scope of embodiments of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

providing a first object associated with a first application, wherein the first object comprises at least one of first image content, first video content, first audio content, or first textual content, the first application automatically generating first object metadata about the first object, wherein the first object metadata is extracted from at least one of the first image content, the first video content, the first audio content, or the first textual content of the first object;

providing one or more second objects associated with second applications, wherein each of the second objects comprises at least one of second image content, second video content, second audio content, or second textual content, the second applications automatically generating second objects metadata about each of the second objects, wherein each of the second objects metadata is extracted from a respective at least one of the second image content, the second video content, the second audio content or the second textual content of the respective second object, based on a predefined rule set and further based on the first object metadata and the second objects metadata, generating relationship data defining one or more related objects associated with the first object on a basis of metadata that indicates that the first object and the one or more related objects share a characteristic or an event;

causing display of first application content associated with the first object, in response to a user selection, wherein the first application content is displayed within the first application;

causing display of an indication, in relation to the displayed first application content, that the first object is selected, and concurrently providing display of a first option to request to view selectable options of respective applications of the second applications with which the one or more related objects are associated;

in response to an indication of a user input of selection of the first option to view selectable options of respective applications of the second applications with which the one or more related objects are associated, wherein the user input is provided while the indication that the first object is selected is displayed, causing presentation of the selectable options of the respective applications of the second applications with which the one or more related objects are associated without performing execution of the respective applications with which the one or more related objects are respectively associated;

receiving an indication of a user selection of one of the selectable options while the respective application remains unexecuted; and in response to the user selection of one of the selectable options, causing presentation of second application content associated with the related objects associated with the selected respective application, wherein the second application content is displayed via execution of the selected respective application if the selected respective application associated with the selected related object is different than the first application, and wherein the second application content is displayed within the first application if the selected respective application is the first application.

2. A method according to claim 1, further comprising:
providing, with each of the selectable options, an indication of a number of related objects corresponding to each of the respective applications of the second applications.

3. A method according to claim 1, further comprising enabling a user to modify the relationship data.

4. A method according to claim 1, further comprising initiating a search of a communication network for objects related to the first object based on metadata extracted from content accessible via the communication network; and generating relationship data associating at least one of the objects with the first object prior to generating relationship data providing for selection of the one or more related objects.

5. A computer program product comprising at least one non-transitory computer-readable storage medium having computer-readable program code portions stored therein, the computer-readable program code portions configured for:

providing a first object associated with a first application, wherein the first object comprises at least one of first image content, first video content, first audio content, or first textual content, the first application automatically generating first object metadata about the first object, wherein the first object metadata is extracted from at least one of the first image content the first video content, the first audio content, or the first textual content of the first object;

providing one or more second objects associated with second applications, wherein each of the second objects comprises at least one of second image content, second video content, second audio content, or second textual content, the second applications automatically generating second objects metadata about each of the second objects, wherein each of the second objects metadata is extracted from a respective at least one of the second image content, the second video content, the second audio content or the second textual content of the respective second object;

based on a predefined rule set and further based on the first object metadata and the second objects metadata, generating relationship data defining one or more related objects associated with the first object on a basis of metadata that indicates that the first object and the one or more related objects share a characteristic or an event;

causing display of first application content associated with the first object, in response to a user selection, wherein the first application content is displayed within the first application;

causing display of an indication, in relation to the displayed first application content, that the first object is selected, and concurrently providing display of a first option to request to view selectable options of respective applications of the second applications with which the one or more related objects are associated;

in response to an indication of a user input of selection of the first option to view selectable options of respective applications of the second applications with which the one or more related objects are associated, wherein the user input is provided while the indication that the first object is selected is displayed, causing presentation of the selectable options of the respective applications of the second applications with which the one or more related objects are associated without performing execution of the respective applications with which the one or more related objects are respectively associated;

receiving an indication of a user selection of one of the selectable options while the respective application remains unexecuted; and in response to user selection of one of the selectable options, causing presentation of second application content associated with the related objects associated with the selected respective application, wherein the second application content is displayed via execution of the selected respective application if the selected respective application associated with the selected related object is different than the first application, and wherein the second application content is displayed within the first application if the selected respective application is the first application.

6. A computer program product according to claim 5, wherein the computer-readable program code portions are further configured for providing, with each of the selectable options, an indication of a number of related objects corresponding to each application.

7. A computer program product according to claim 5, wherein the computer-readable program code portions are further configured for enabling a user to modify the relationship data.

8. A computer program product according to claim 5, wherein the computer-readable program code portions are further configured for initiating a search of a communication network for objects related to the first object based on metadata extracted from content accessible via the communication network; and an executable portion for generating relationship data associating at least one of the objects with the first object prior to the generating relationship data providing for selection of the one or more related objects.

9. An apparatus comprising a processor and memory including computer program code, the memory and the computer program code configured to, working with the processor, cause the apparatus to perform at least the following:

providing a first object associated with a first application, wherein the first object comprises at least one of first image content, first video content, first audio content, or first textual content, the first application automatically generating first object metadata about the first object, wherein the first object metadata is extracted from at least one of the first image content, the first video content, the first audio content, or the first textual content of the first object;

providing one or more second objects associated with second applications, wherein each of the second objects comprises at least one of second image content, second video content, second audio content, or second textual content, the second applications automatically generating second objects metadata about each of the second objects, wherein each of the second objects metadata is extracted from a respective at least one of the second image content, the second video content, the second audio content or the second textual content of the respective second object;

based on a predefined rule set and further based on the first object metadata and the second objects metadata, generating relationship data defining one or more related objects associated with the first object on a basis of metadata that indicates that the first object and the one or more related objects share a characteristic or an event;

causing display of first application content associated with the first object, in response to a user selection, wherein the first application content is displayed within the first application;

causing display of an indication, in relation to the displayed first application content, that the first object is selected, and concurrently providing display of a first option to request to view selectable options of respective applications of the second applications with which the one or more related objects are associated;

in response to an indication of a user input of selection of the first option to view selectable options of respective applications of the second applications with which the one or more related objects are associated, wherein the user input is provided while the indication that the first object is selected is displayed, causing presentation of the selectable options of the respective applications of the second applications with which the one or more related objects are associated without performing execution of the respective applications with which the one or more related objects are respectively associated;

receiving an indication of a user selection of one of the selectable options while the respective application remains unexecuted; and in response to user selection of one of the selectable options, causing presentation of second application content associated with the related objects associated with the selected respective application, wherein the second application content is displayed via execution of the selected respective application if the selected respective application associated with the selected related object is different than the first application, and wherein the second application content is displayed within the first application if the selected respective application is the first application.

10. An apparatus according to claim 9, wherein the memory and the computer program code are further configured to, working with the processor, provide, with each of the selectable options, an indication of a number of related objects corresponding to each application.

11. An apparatus according to claim 9, wherein the memory and the computer program code are further configured to, working with the processor, cause the apparatus to enable a user to modify the relationship data.

12. An apparatus according to claim 9, wherein the memory and the computer program code are further configured to, working with the processor, cause the apparatus to initiate a search of a communication network for objects related to the first object based on metadata extracted from content accessible via the communication network; and generate relationship data associating at least one of the objects with the first object prior to the accessing relationship data providing for selection of the one or more related objects.

* * * * *